United States Patent
Hassibi et al.

(10) Patent No.: US 6,693,976 B1
(45) Date of Patent: Feb. 17, 2004

(54) METHOD OF WIRELESS COMMUNICATION USING STRUCTURED UNITARY SPACE-TIME SIGNAL CONSTELLATIONS

(75) Inventors: Babak Hassibi, Somerset, NJ (US); Bertrand M Hochwald, Summit, NJ (US); Thomas Louis Marzetta, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/528,973

(22) Filed: Mar. 21, 2000

(51) Int. Cl.$^7$ .................... H04K 1/10; H04L 27/20
(52) U.S. Cl. ........................ 375/299; 375/260
(58) Field of Search .................. 375/299, 240, 375/347, 260

(56) References Cited

U.S. PATENT DOCUMENTS

| | | | |
|---|---|---|---|
| 5,479,448 A | * 12/1995 | Seshadri | 375/267 |
| 5,832,044 A | * 11/1998 | Sousa et al. | 375/347 |
| 6,088,408 A | * 7/2000 | Calderbank et al. | 375/347 |
| 6,317,411 B1 | * 11/2001 | Whinnett et al. | 370/204 |
| 6,327,310 B1 | * 12/2001 | Hochwald et al. | 375/259 |
| 6,363,121 B1 | * 3/2002 | Hochwald et al. | 375/260 |

OTHER PUBLICATIONS

U.S. patent application Ser. No. 08/938,168, filed on Sep. 26, 1997.
U.S. patent application Ser. No. 08/673,981, filed on Jul. 1, 1996.
U.S. patent application Ser. No. 09/060,657, filed on Apr. 15, 1998.
U.S. patent application Ser. No. 09/112,853, filed on Jul. 10, 1998.
U.S. patent application Ser. No. 09/134,297, filed on Aug. 14, 1998.
U.S. patent application Ser. No. 09/206,843, filed on Dec. 7, 1998.

* cited by examiner

Primary Examiner—Stephen Chin
Assistant Examiner—Lawrence Williams
(74) Attorney, Agent, or Firm—Martin I. Finston

(57) ABSTRACT

A method is disclosed for generating unitary space-time signals for wireless communication using an array of M transmitting antennas. Each unitary space-time signal comprises T symbols. The method can be used to generate arbitrarily large signal constellations. The resulting unitary space-time signals have statistical properties that are favorable for reliable use in communication, and they can lead to very high data transmission rates. The disclosed method involves the mapping of binary strings of data to matrix products of the kind obtained by left-multiplying an initial T×M matrix by an ordered multiplicative sequence of exponentiated T×T unitary matrices, referred to as generator matrices. The result of each such multiplication is a unitary space-time signal matrix that may be transmitted. Each generator matrix corresponds to a single bit or a collection of bits of a binary string that is to be mapped. The value of the exponent of each generator matrix is determined by the pertinent bit or collection of bits.

6 Claims, 3 Drawing Sheets

METHOD OF WIRELESS COMMUNICATION USING STRUCTURED UNITARY SPACE-TIME SIGNAL CONSTELLATIONS

FIELD OF THE INVENTION

This invention relates to modulation methods for wireless signal transmission. More particularly, the invention relates to modulation methods useful in fading environments in conjunction with multiple-antenna arrays.

BACKGROUND OF THE INVENTION

It is generally desirable to reduce error rates, and to increase transmission rates, in wireless transmission systems. Multiple-antenna arrays can be used to achieve these desirable effects.

Fading is one of several physical phenomena that tend to increase error rates, or to reduce channel capacity, in traditional single-antenna wireless transmission systems. Fading is the result of destructive interference, at the receiver, between correlated signal portions that because of scattering have arrived over different-length paths.

In fading environments, the capacity of a multiple-antenna communication link may increase with the size of the transmitter or receiver array. This effect has been predicted, e.g., for rich scattering environments in which fading is "flat." In flat fading, the propagation coefficients that describe the effect of the physical transmission channel on the transmitted signal are approximately independent of frequency over the signal bandwidth. Flat fading can be achieved in practice for a particular environment if the bandwidth is not too great, or if it is restricted appropriately.

Some methods for exploiting such an increase in capacity use knowledge of the propagation coefficients between all pairs of transmitter and receiver antennas. Such knowledge is gained, e.g., by training the receiver with known training signals from the transmitter.

Communication methods that use such a training procedure are described, for example, in the co-pending U.S. patent application Ser. No. 08/938,168, commonly assigned herewith, filed on Sep. 26, 1997 by B. M. Hochwald et al. under the title, "Multiple Antenna Communication System and Method Thereof."

Other co-pending patent applications, commonly assigned herewith, that describe related subject matter are Ser. No. 08/673,981, filed on Jul. 1, 1996 by G. J. Foschini under the title "Wireless Communications System Having a Layered Space-Time Architecture Employing Multi-Element Antennas," Ser. No. 09/060,657, filed on Apr. 15, 1998 by G. J. Foschini and G. D. Golden under the title "Wireless Communications System Having a Space-Time Architecture Employing Multi-Element Antennas at Both the Transmitter and Receiver," and Ser. No. 09/112853, filed on Jul. 10, 1998 by T. L. Marzetta under the title "Determining Channel Characteristics in a Space-Time Architecture Wireless Communication System Having Multi-Element Antennas."

Unfortunately, training intervals cut into the available time during which data may be transmitted. The length of this interval increases as the number of transmitter antennas is increased. Moreover, the propagation coefficients can be treated as constant only over an average period of time referred to as the fading coherence interval. To be effective, training should be repeated at least once per such interval. However, fading is very rapid in some environments, such as those in which a mobile station is operating within a rapidly moving vehicle. For rapid fading environments, the time between fades may be too short for the communication system to learn the propagation coefficients belonging to even one transmitting antenna, much less those of a multiple-antenna array.

Thus, there are advantages to a signal modulation method that can at least partially realize the theoretical benefits of multiple-antenna arrays in fading environments without the benefit of known propagation coefficients.

In the co-pending U.S. patent application Ser. No. 09/134, 297, commonly assigned herewith, filed on Aug. 14, 1998 by B. M. Hochwald et al. under the title, "Wireless Transmission Method for Antenna Arrays, Having Improved Resistance to Fading," there was described a new method of signal modulation. This new method, which we refer to as "Unitary Space-Time Modulation (USTM)," is robust against fading and receiver-induced noise in flat fading environments. Significantly, it does not require knowledge of the propagation coefficients, although in some implementations, such knowledge can be used to further improve performance.

In USTM, each message to be transmitted is transformed into a sequence of signals selected from a constellation of L possible signals, L a positive integer. (Thus, each transmitted signal embodies a number of bits given by log L. In the present discussion, "log" will denote the binary logarithm.) Each of these signals is, itself, a time sequence of complex amplitudes for transmission by the transmitting antenna or antennas. The term "complex" includes pure real and pure imaginary values. (We will speak, in general terms, of a transmitting array having a plurality of transmitting antennas. However, it should be noted that the number M of transmitting antennas may be 1.) The transmissions by all of the antennas in the transmitting array are concerted. All of these transmissions (for a given signal) are made in the same sequence of T successive time units (which we refer to as symbol intervals), T a positive integer.

Thus, a signal may be represented by a complex-valued matrix having T rows and M columns. The term "complex-valued" matrix includes matrices some or all of whose elements are pure real or pure imaginary. Each column corresponds to a respective antenna of the transmitting array, and represents the sequence of baseband-level complex amplitudes to be transmitted by that antenna. Each row corresponds to a particular one of the T symbol intervals, and describes the complex amplitude to be transmitted by each respective antenna during that interval. Such a set of complex amplitudes is referred to as a "symbol." Each symbol is distributed in space (i.e., across the transmitting array), and each signal is composed of T symbols distributed in time.

Because each signal is distributed in space and time, and because each signal matrix has orthonormal columns, we refer to the signal matrices as unitary space-time signals.

For data transmission rates to be advantageously high, it is desirable in many cases to have very large constellations of unitary space-time signals, exemplarily constellations of hundreds of thousands of signals, or even more. The likelihood of misidentifying a received unitary space-time signal is minimized if for each pair of non-identical signal matrices, each column of one is orthogonal to every column of the other. However, elementary principles of matrix algebra dictate that over the entire constellation, there can be no more than T mutually orthogonal columns. Many practical constellations will be much larger than T, thus precluding such pairwise column orthogonality for most of the signals. In such cases, the likelihood of receiver error is advantageously reduced by constellations in which there are relatively low correlations between pairs of signal matrices.

Because signal constellations may be very large, naïve efforts to construct appropriate constellations will generally be very demanding of computational resources. One solution to this problem is described in the co-pending U.S. patent application Ser. No. 09/206843, commonly assigned herewith, filed on Dec. 7, 1998 by B. M. Hochwald et al. under the title, "Wireless Transmission Method For Antenna Arrays Using Unitary Space-Time Signals." Described there is a method for generating a signal constellation from an initial T×M signal matrix and a generator matrix which is T×T unitary. The product obtained by left multiplying the initial signal matrix by the generator matrix is a further signal matrix. Left-multiplying the product by the generator matrix yields yet a further signal matrix, and so on for further repeated applications of the generator matrix. Significantly, the generator matrix can be tailored in such a way that the resulting product matrices tend to have relatively low correlations with each other. Thus, an appropriate subset of these product matrices is advantageously employed as a signal constellation.

Although such an approach as that described above is useful, there remains a need for still higher data transmission rates using multiple-antenna arrays.

SUMMARY OF THE INVENTION

We have discovered a method for generating unitary space-time signals belonging to constellations of arbitrary size. Our generation method is of low computational complexity. The resulting unitary space-time signals have statistical properties that are favorable for reliable use in communication, and they can lead to very high data transmission rates.

In a broad aspect, our new generation method involves the mapping of binary strings of data to matrix products of a particular kind. Each matrix product is obtained by left-multiplying an initial T×M matrix by an ordered multiplicative sequence of at least two, but not more than RT, T×T unitary matrices, which we also refer to herein as complex rotation matrices. RT is a positive integer to be discussed below. The result is a unitary space-time signal matrix that may be transmitted.

An ordered set of T×T unitary matrices is provided. These are referred to as the generator matrices. Each generator matrix corresponds to a single bit or a collection of bits of a binary string that is to be mapped. Each generator matrix is raised to a power equal to an integer exponent. The value of the exponent is determined by the pertinent bit or collection of bits. A generator matrix raised to the zero power is defined to be an identity matrix. The exponentiated matrices, in their assigned sequential order, then left-multiply the initial T×M matrix.

In an exemplary embodiment of the invention, there are RT generator matrices. The ordinal position of each generator matrix corresponds to the ordinal position of a corresponding bit in the binary strings that are to be mapped. The mapping of a binary string is achieved by assigning as the exponent for each generator matrix the value of its corresponding bit (or, alternatively, the complementary value of the corresponding bit). Equivalently, each generator matrix whose corresponding bit is, e.g., a 1 bit is retained, and each generator matrix whose corresponding bit is a 0 bit is replaced by an identity matrix.

In alternate embodiments of the invention, the choice between a given generator matrix and an identity matrix may be responsive to a higher-level property of the string then raw bit values. For example, it may be responsive to transitions between bits. Alternatively, such choice may be responsive, in effect, to a secondary string of bits obtained from the original string by coding, encryption, or data compression.

It will be appreciated that the signal matrices generated as described above belong to a constellation of size $L=2^{RT}$. The parameter R is the data transmission rate in bits per symbol interval. Transmission of a complete signal matrix requires T symbol intervals, one for each row of the signal matrix.

DETAILED DESCRIPTION

Corresponding to each unitary space-time signal matrix $\Phi$, the baseband signals provided to the transmitting array are represented by a matrix S, where $S=\sqrt{T}\Phi$.

Figure 1:
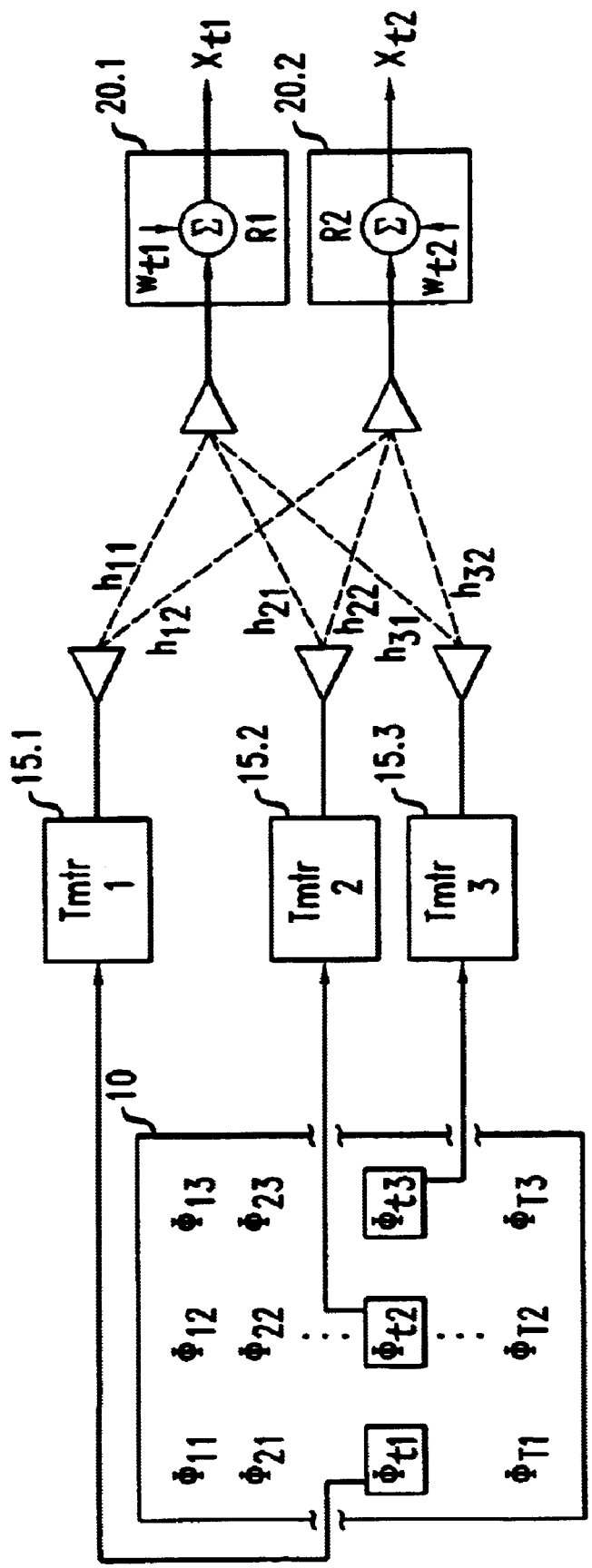
FIG. 1 is a simplified schematic diagram illustrating wireless communication using unitary space-time modulation (USTM).

FIG. 1 shows a baseband signal 10, consisting of matrices S, being input to a transmitting array of antennas 15.1–15.3, and transmitted to a receiving array of antennas 20.1, 20.2. Thus, in the communication system shown, M=3 and N=2. (N is the number of antennas in the receiving array, which may be 1 or greater.) The physical transmission channel between the transmitting and receiving antennas is characterized by a set of M·N propagation coefficients $h_{ij}$, i=1, ..., M, j=1, ..., N, each a complex scalar characterizing the response at receiving antenna j due to transmissions from transmitting antenna i.

At each value t of discrete time, t=1, ..., T, one of the rows of the signal matrix is input to the transmitting array. FIG. 1 shows the t'th such row being input, with each entry in the row input to a respective one of antennas 15.1–15.3. Each entry of the signal matrix represents a complex-valued baseband voltage level which, for transmission, is modulated onto the carrier frequency according to known methods.

At each receiving antenna 20.1, 20.2, the antenna response is amplified and demodulated to baseband according to known methods. Receiver noise is represented in the figure as a component $w_{t1}$ added to the output of antenna 20.1 and a component $W_{t2}$ added to the output of antenna 20.2 at each time t. After demodulation to baseband, the output of the antenna array at time t is $X_{tn}$, where n=1 for antenna 20.1 and n=2 for antenna 20.2. In vector notation, the response $X_t$, of the receiving array to the t'th row $S_t$ of transmitted signal matrix S (the index l is suppressed here) is given by $$X_t = \sqrt{\frac{\rho}{M}} S_t H + w_t.$$

In the preceding expression, $\rho$ represents the expected signal-to-noise ratio at each receive antenna.

If H can be treated as constant during the time period T, then over that period, the response of the receiver array is given by $$X = \sqrt{\frac{\rho}{M}} S H + W,$$

where W is a T×N matrix whose t,n entry represents the additive noise at time t and receiver n.

One exemplary method for recovering the transmitted signal from the received signal X involves a decision process known in the art as a "maximum likelihood (ML) receiver." A ML receiver functions by selecting that candidate signal that maximizes the likelihood of observing the signal X actually received. A score is computed for each candidate signal. The received signal is then identified with candidate signal that yields the greatest score.

More specifically, the operation of a ML receiver comprises calculating the conditional probability $p(X|\Phi_l)$ of receiving this particular X, given that the transmitted signal matrix was each of the $\Phi_l$ in turn. The $\Phi_l$ that yields the greatest value of this conditional probability is identified as the transmitted signal. This "maximum likelihood signal" $\Phi^{ML}$ is symbolically represented as the argument of a maximization procedure by the expression $$\Phi^{ML} = \underset{\Phi_l}{\operatorname{argmax}} p(X \mid \Phi_l).$$

When it is possible, to a reasonable approximation, to consider the propagation coefficients to be Rayleigh distributed and the receiver noise to be complex Gaussian and independent with unit variance, the maximum likelihood signal can be evaluated by maximizing a particularly simple expression. (By "Rayleigh distributed," we mean that: the values of the propagation coefficients $h_{mn}$ are identically distributed and statistically independent, that the magnitudes of the propagation coefficients are proportional to Rayleigh distributed random variables, and that their phases are uniformly distributed from 0 to $2\pi$ radians. Those skilled in the art will understand from this that the real and imaginary parts of the propagation coefficients are zero-mean, independent, identically distributed, Gaussian random variables.) In such a case, $$\underset{\Phi_l}{\operatorname{argmax}} p(X \mid \Phi_l) = \underset{\Phi_l}{\operatorname{argmax}} \sum_{m=1}^{M} \sum_{n=1}^{N} |\Phi_{lm}^\dagger \underline{X}_n|^2.$$

In the double-sum expression, the quantity within the vertical bars is the vector dot product between the complex conjugate of the m'th column of $\Phi_l$, and the n'th column of X. (The underscore beneath the factors within the vertical bars denotes that these quantities are column vectors.)

An important consideration in any method of message transmission is capacity; that is, the amount of information that can be reliably transmitted per unit time in a communication channel. We define a channel use as one block of T transmitted symbols (i.e., one transmitted signal matrix). We measure the channel capacity in bits per symbol. Data can be transmitted reliably at any rate less than the channel capacity. Thus, the channel capacity limits the number of bits per signal, or log L.

As noted, the coherence interval is the length of time over which the propagation coefficients can be regarded as approximately constant. In the following discussion, the symbol $\tau$ will represent coherence interval.

The number T of symbols per signal should not exceed $\tau$, because if it does, fading effects will tend to corrupt the received signal, and the advantages achievable with our method will be reduced. However, if T is substantially less than $\tau$, the channel will be used inefficiently, which might lead to a greater error rate. Therefore, it will generally be advantageous for T to be equal, or nearly equal, to $\tau$.

It should be noted in this regard that we have recently discovered a new effect, which we refer to as autocoding, in connection with, e.g., USTM communication. Due to the autocoding effect, error rates can be made arbitrarily small, without any redundancy of transmitted information among coherence intervals. More specifically, provided large signal constellations are available, and provided the data transmission rate is smaller than a limit referred to as the autocapacity, error rates go down as T and M grow large together (with, e.g., a constant ratio between them). The autocapacity $C_a$, in units of bits per symbol, is given by $C_a = N \cdot \log(1+\rho)$.

However, to achieve substantial advantages of the autocoding effect, it is desirable to use very large signal constellations, e.g., constellations containing millions of signal matrices, and even containing as many as $2^{80}$ signal matrices or more. It is not a trivial matter to construct such large constellations with any assurance that the selected signal matrices are sufficiently independent.

In regard to the autocoding effect, we have mathematically determined that within a coherence interval of finite duration, bits can theoretically be transmitted at a rate that is a substantial fraction of the autocapacity, with low probability of error, using a random codebook, or constellation, of L, T×M independent, random, and isotropically distributed unitary space-time signals, where $L=2^{RT}$. In this regard, it is instructive to speak of the block error probability $P_e$, defined as the probability of misidentifying a received signal matrix, and the pair-wise error probability $P_e\{\Phi_1 \text{ vs. } \Phi_2\}$, which is the probability of confusion between any distinct pair of independent signals in the constellation. By applying well-known union-bound techniques, it is readily shown that the block error probability is always less than L times the expected value of the pairwise error probability: $P_e < 2^{RT} E_{\Phi_1, \Phi_2}\{P_e\{\Phi_1 \text{ vs. } \Phi_2\}\}$. The pairwise error probability, in turn, is readily calculated from the formula:

$$P_e\{\Phi_1 \text{ vs. } \Phi_2\} = \frac{1}{\pi} \int_0^{\frac{\pi}{2}} d\theta \prod_{m=1}^{M} \left[ \frac{\cos^2\theta}{\cos^2\theta + \frac{(\rho T/M)^2(1-d_m^2)}{4(1+\rho T/M)}} \right]^N, \quad \text{(Eq. 1)}$$

where $d_1, \ldots, d_m$ are the singular values of the M×M matrix $\Phi_2^\dagger \Phi_1$, and the symbol "$\dagger$" denotes complex transposition. The integral in the preceding expression is readily evaluated using numerical techniques, and the expectation value of the pairwise error probability can be calculated in closed form. Thus, an upper bound is readily calculated for the block error probability. In the Example section below, calculations of the resulting bound are presented for various values of R, M, and T.

Figure 2:
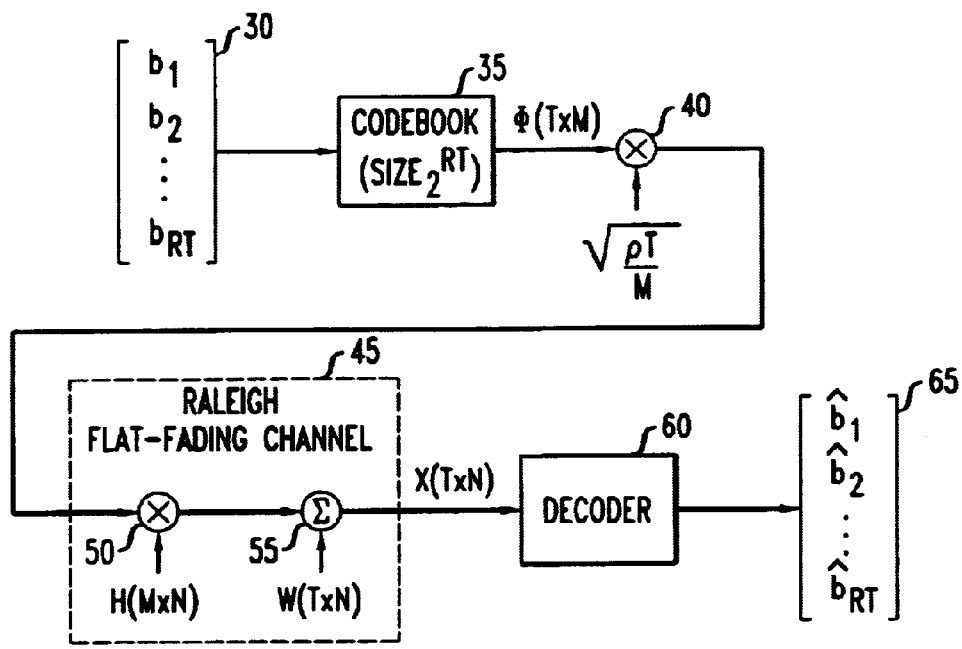
FIG. 2 is a simplified schematic diagram illustrating USTM communication using signal constallations according to the present invention.

The preceding discussion is summarized in FIG. 2 where, as shown, a binary string 30 is encoded at block 35 to form a signal matrix belonging to a constellation or codebook of size $2^{RT}$. The multiplicative factor of $$\sqrt{\frac{\rho T}{M}}$$

indicated at block 40 is included to symbolically account for the effects of receiver noise power and attenuation of the transmission power. The factor of $\sqrt{M}$ in the denominator accounts for the fact that the available signal power is distributed over M transmission antennas. The propagation channel is symbolized by block 45, within which block 50 represents the coupling, via the matrix H of channel coefficients, between the transmitting and receiving antenna elements, and block 55 represents the effect of additive noise. At block 60, the received signal is decoded to recover estimate 65 of transmitted binary string 30.

Figure 3:
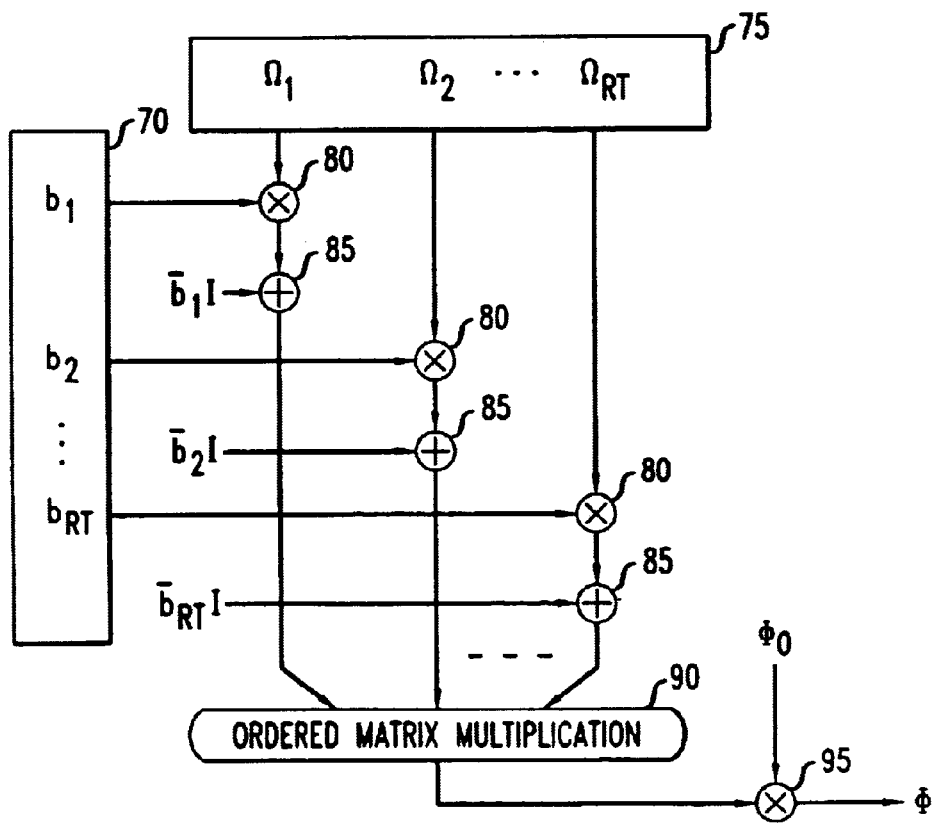
FIG. 3 is a schematic diagram illustrating the mapping of a binary string to a USTM signal matrix according to the invention in an exemplary embodiment.

With reference to FIG. 3, we will now describe the encoding that takes place within block 35 of FIG. 2. Each binary string 70 to be encoded consists of RT bits $b_1, \ldots, b_{RT}$. To each ordinal position i within the string, $i=1, \ldots, RT$, there corresponds a respective generator matrix $\Omega_i$ of set 75 of RT generator matrices. As indicated in the figure at multiplication points 80, each generator matrix is used to generate the signal matrix $\Phi$ only if the corresponding bit is "1". Otherwise, for illustrative purposes, the generator matrix may be regarded as replaced by an identity matrix I in the signal-generation step. Accordingly, we have symbolized the selection or non-selection of each generator matrix as multiplication by the corresponding bit (which will result in selection if the bit is "1" and in a zero product if the bit is "0"), followed by an addition step at summing points 85. At each summing point 85, the output of the corresponding multiplication point 80 is added to the identity matrix, multiplied by the complement of the corresponding bit. Thus, if the corresponding bit is "1", the output of the summing point is the corresponding generator matrix. If the corresponding bit is "0", the output of the summing point is the identity matrix.

At multiplication point 90, a composite generator matrix is assembled by multiplying together, in sequence, the outputs from summing points 85. That is, the composite generator matrix may be described by $\Omega_{comp} = \Omega_1^{b_1} \Omega_2^{b_2} \ldots \Omega_{RT}^{b_{RT}}$, where for each ordinal position i, $\Omega_i^{b_i}$ equals $\Omega_i$ if $b_i$ equals 1, and $\Omega_i^{b_i}$ equals the identity matrix if $b_i$ equals 0. At multiplication point 95, the composite generator matrix left-multiplies an initial signal matrix $\Phi_0$ to generate signal matrix $\Phi$.

It should be noted that the computational steps as shown in FIG. 3 are meant to be illustrative only, and that alternative sequences of steps, which would bring about equivalent results, are also meant to fall within the scope of the invention. For example, it is not necessary to completely form the composite generator matrix first, and then apply it to the matrix $\Phi_0$. As will be appreciated by those skilled in the art, $\Phi_0$ can, e.g., be multiplied first by the rightmost generator matrix, and the product multiplied by the next rightmost generator matrix, etc. Alternatively, various groupings of adjacent generator matrices can be multiplied together before applying the result to further transform the initial matrix. Thus, there are many alternative computational schemes which preserve the sequential ordering of the generator matrices and bring about an equivalent transformation of the initial signal matrix.

In the embodiment illustrated in FIG. 3, there is a one-to-one correspondence between the bits $b_i$ and generator matrices $\Omega_i$. In alternate embodiments of the invention, a collection of two or more bits, but fewer than all RT of the bits, may be represented by an expression in which a generator matrix is raised to a power derived as a weighted sum of the values of the pertinent bits. For example, bits $b_1-b_3$ may be represented by a matrix $\Omega^p$, wherein $\Omega$ is a simple generator matrix, $\Omega^p$ is an exponentiated generator matrix, and $p=b_1+2b_2+4b_3$. Such an expression is effective for mapping each of the eight possible combined values of the bits $b_1-b_3$ to a distinct exponentiated matrix.

Thus, broadly speaking, the composite generator matrix is a product of a multiplicative sequence of two or more generator matrices of the form $\Omega^p$, wherein a single bit or a collection of bits corresponds to each matrix $\Omega$, and the value of p is determined by the corresponding bit or collection of bits. The transformation brought about by multiplying a T×M matrix by a generator matrix, whether simple, exponentiated, or composite, may be thought of as a complex rotation. Thus, the sequential multiplication of generator matrices is equivalently described as a compounding of complex rotations.

It is advantageous for the signal matrices $\Phi$ to possess certain statistical properties. Specifically, for the block error probability to have the upper bound described above, the signal matrices should be marginally isotropically random and pairwise independent. In this regard, a T×T random unitary matrix is isotropically distributed if its probability density is invariant to left-multiplication by any T×T deterministic unitary matrix. Similarly, a T×M random unitary matrix is isotropically distributed if its probability density is invariant to left-multiplication by any T×T deterministic unitary matrix.

The advantageous statistical properties could, at least in principle, be obtained by directly generating $2^{RT}$ independent, random, isotropically distributed signal matrices. However, the above-described method using RT generator matrices is far more tractable, in general. In fact, we have mathematically proven that when RT independent, random, isotropically distributed generator matrices are used as described above, each exponentiated by 0 or 1, the same advantageous statistical properties are obtained, and the union bound of Equation (1) still applies.

The generator matrices $\Omega_i$ and the initial signal matrix $\Phi_0$ are readily constructed so as to assure the desired statistical properties. According to an exemplary procedure for constructing an appropriate generator matrix, a matrix Y is first generated, whose matrix elements are independent, complex statistical variables having a Gaussian distribution with zero mean and unit variance. The generator matrix is then set equal to $Y(Y^{\dagger} Y)^{-\frac{1}{2}}$, wherein the symbol "$\dagger$" represents conjugate transposition. Those skilled in the art will appreciate that one technique for making this calculation makes use of a Cholesky factorization. That is, the product $Y^{\dagger}Y$ can be factored as a product $R^{\dagger}R$, where R is a triangular matrix. Once R (or the equivalent) has been obtained by standard techniques, the desired generator matrix is readily obtained as the product $YR^{-1}$. The initial signal matrix $\Phi_0$ is constructed, e.g., by simply taking the first M columns of a generator matrix constructed as described here.

EXAMPLE

Figure 4:
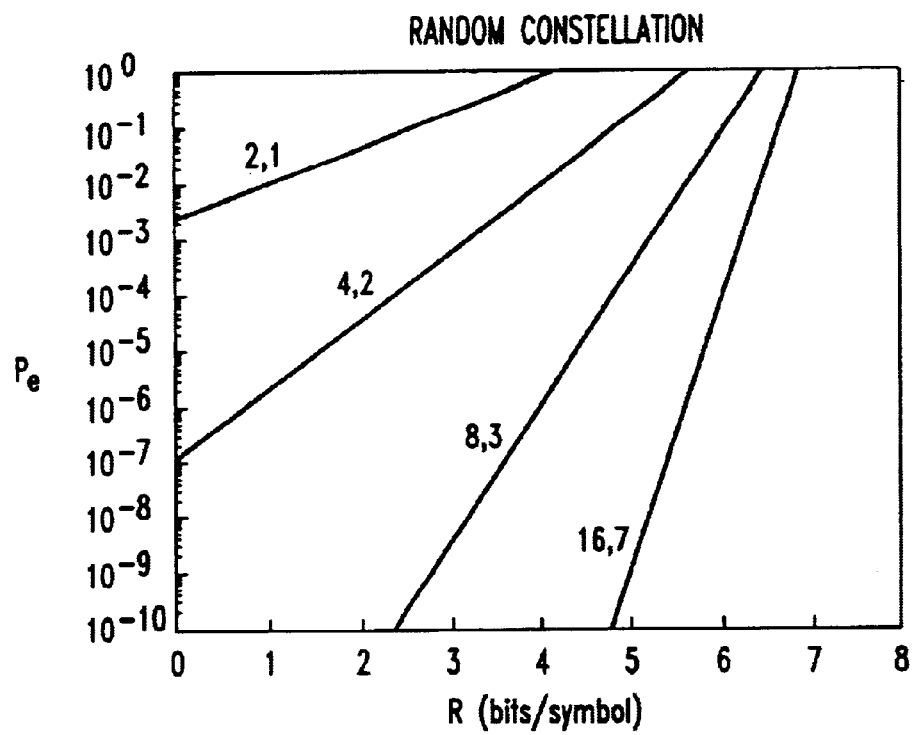
FIG. 4 is a graph of the results of a series of numerical simulations of the performance of a communication system using USTM in accordance with the invention in one embodiment. Block error probability is graphed in the figure as a function of data transmission rate. Separate curves are shown for four different combinations of T-values and M-values.

We performed a series of numerical simulations to determine the variation of block error probability, as represented by the upper bound described above, with data transmission rate. FIG. 4 contains a family of plots showing this dependence for various combinations of signal length T and the number M of transmit antennas. For each of the plots shown, the number N of receive antennas is 4, and the signal-to-noise ratio ρ at each receive antenna is 18 dB. The autocapacity is 24.01 bits per symbol. The respective (T,M) combinations, as indicated in the figure, are (2,1), (4,2), (8,3), and (16,7).

Figure 5:
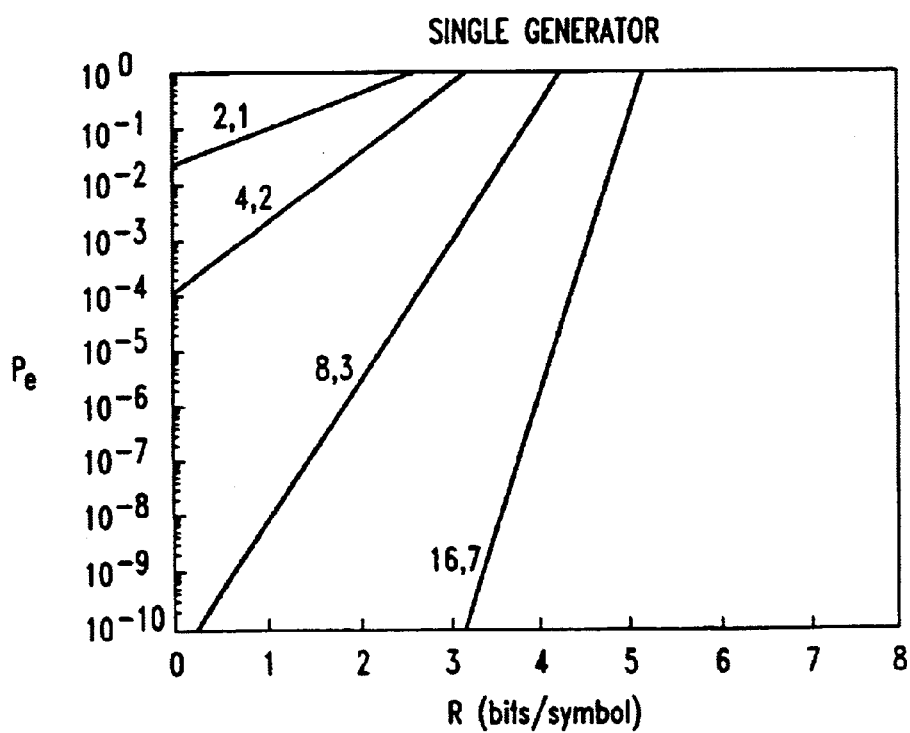
FIG. 5 is a graph of the results of a series of numerical simulations analogous to those of FIG. 4, but based on a USTM technique of the prior art.

For comparison, we present, in FIG. 5, the results of analogous numerical simulations using unitary space-time signals generated by repeated applications of a single generator matrix, as described in U.S. patent application Ser. No. 09/206843, cited above. It will be evident from a comparison of FIGS. 4 and 5 that for every (T,M) combination and at every data transmission rate, substantial improvements in error performance are achieved using the signal constellation of the present invention. For example, FIG. 4 predicts that for as few as two transmit antennas and signal lengths as short as four symbols, the present invention can achieve a data transmission rate of 2.5 bits per symbol with a block error rate of about $10^{-4}$. By contrast, the corresponding block error rate predicted by FIG. 5 is greater than $10^{-2}$, and communication is not even feasible, at the stated values of M and T, with a block error rate as low as $10^{-4}$.

The constellation size required, according to FIG. 4, for a data transmission rate of 2.5 bits per symbol with (T,M)= (4,2) is $2^{10}$. At typical communication bandwidths of several tens of kilohertz, real-time maximum-likelihood decoding of signals from a constellation of such size is feasible using, e.g., parallel processors. Off-line decoding, or decoding at smaller communication bandwidths, is feasible even using currently available uniprocessors. Communication according to the present invention will be particularly useful in applications that demand extremely high reliability in fading environments.

What is claimed is:

1. A method for transmitting a message that comprises at least one sequence $(b_1, b_2 \ldots, b_n)$ of n bits, n a positive integer at least 2, the method comprising:

(a) applying a transformation to an initial matrix, thereby to obtain a T×M signal matrix, T a positive integer at least 2, M a positive integer at least 1; and (b) transmitting a modulated carrier wave from an array of M antennas such that each row of the signal matrix corresponds to a transmission time interval, each column of the signal matrix corresponds to a respective antenna of the array, and each element of the signal matrix corresponds to a complex baseband amplitude transmitted, after modulation onto the carrier wave, from the corresponding antenna during the corresponding time interval; wherein:

(I) the transformation is equivalent to an ordered multiplication of the initial matrix by a sequence of at least two complex rotation matrices;

(II) each rotation matrix corresponds to a respective bit, or to a respective collection of fewer than n bits, of the bit sequence.

2. The method of claim 1, wherein each rotation matrix of the sequence has the form $\Omega^p$, wherein $\Omega$ is a distinct unitary matrix, and p is an exponent determined by the corresponding bit or collection of bits.

3. The method of claim 2, wherein a distinct rotation matrix $\Omega_i$ corresponds to each position i in the bit sequence, each rotation matrix $\Omega_i$ is raised to a power expressed by an exponent $p_i$, and the values of all the exponents $p_i$ are equal to the values of their corresponding bits $b_i$ or the complementary values thereof.

4. The method of claim 2, wherein the exponent of at least one rotation matrix is a weighted sum of the values of the corresponding bits.

5. The method of claim 1, wherein the bit sequence $(b_1, b_2, \ldots, b_n)$ is obtained from a prior bit sequence by coding, encryption, or data compression.

6. The method of claim 1, wherein the complex rotation matrices are independent, random, and isotropically distributed.

* * * * *